(12) United States Patent  
Grimes

(10) Patent No.: US 6,196,612 B1  
(45) Date of Patent: Mar. 6, 2001

(54) STORABLE EXTERIOR SEAT FOR A VEHICLE

(75) Inventor: John A. Grimes, Dover, NH (US)

(73) Assignee: Textron Automotive Company, Dover, NH (US)

( * ) Notice: Subject to any disclaimer, the term of this patent is extended or adjusted under 35 U.S.C. 154(b) by 0 days.

(21) Appl. No.: 09/077,952

(22) PCT Filed: Jan. 22, 1997

(86) PCT No.: PCT/US97/00995

§ 371 Date: May 13, 1999

§ 102(e) Date: May 13, 1999

(87) PCT Pub. No.: WO97/27075

PCT Pub. Date: Jul. 31, 1997

(51) Int. Cl.[7] ....................................... B60N 2/12

(52) U.S. Cl. .................................. 296/65.05; 296/65.01; 293/117

(58) Field of Search .................................. 296/65.01, 64, 296/65.05, 69, 37.1; 293/106, 117; 108/44; 280/163, 762; 297/15, 147, 331, 335, 334

(56) References Cited

U.S. PATENT DOCUMENTS

| | | |
|---|---|---|
| 2,228,203 | 1/1941 | Hoffman . |
| 3,338,620 | 8/1967 | Cauvin . |
| 3,357,719 * | 12/1967 | McCrea ................................ 280/163 |
| 3,796,456 | 3/1974 | Bergeson et al. . |
| 4,089,276 | 5/1978 | Enos . |
| 5,040,467 * | 8/1991 | King .................................. 108/44 X |

* cited by examiner

Primary Examiner—D. Glenn Dayoan  
Assistant Examiner—Jason Morrow  
(74) Attorney, Agent, or Firm—Reising, Ethington, Barnes, Kisselle, Learman & McCulloch PC

(57) ABSTRACT

An automotive seat assembly (10, 10') including a platform (18, 18') supported on an automotive vehicle (12, 12'). The platform (18, 18') is movable through a storage compartment opening (22, 22') in an exterior shell (14, 14') of the vehicle (12, 12') between an interior stowed position and a horizontal exterior use position. A platform support structure (24, 24') secures the platform (18, 18') in the use position. The platform support structure (24, 24') includes a bumper (26, 26') supported on the vehicle (12, 12') below the storage compartment opening (22, 22'). The bumper (26, 26') supports the platform (18, 18') when the platform (18, 18') is in the use position. A spacer pad (36) fixed to a bottom surface (62) of the platform (18) protects the finish of the bumper (26).

22 Claims, 4 Drawing Sheets

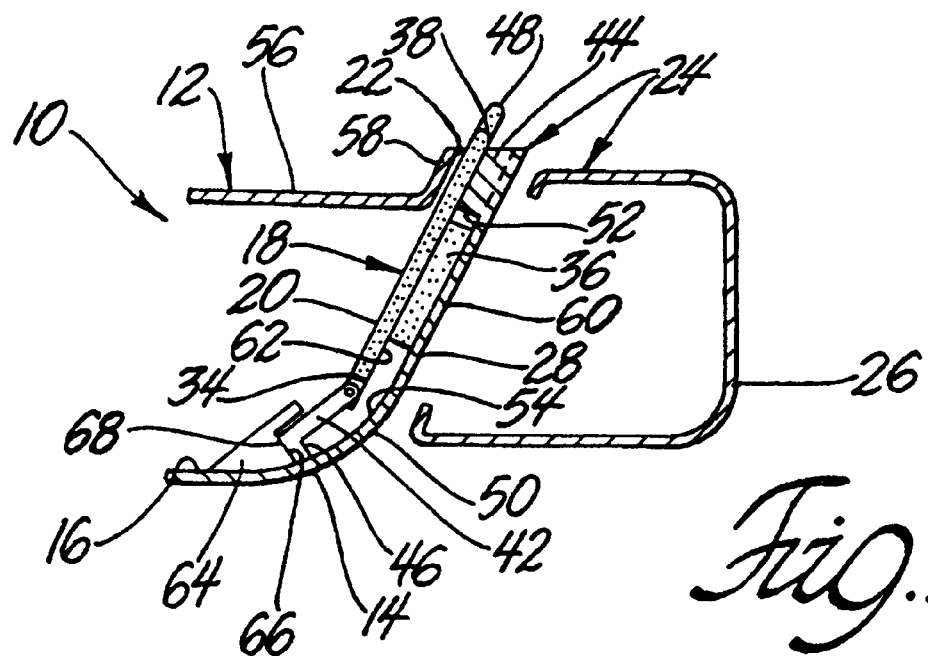
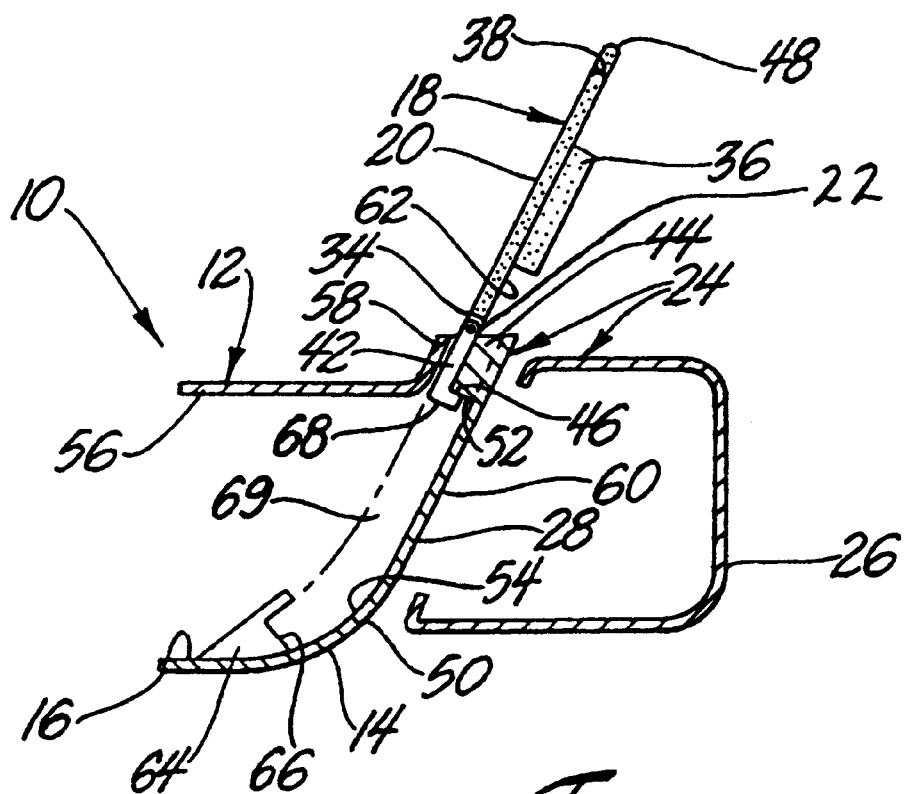

STORABLE EXTERIOR SEAT FOR A VEHICLE

TECHNICAL FIELD

This invention relates generally to an automotive seat and, more particularly, to such a seat that is movable between a stowed and a use position.

BACKGROUND OF THE INVENTION

It is well known for automotive vehicles such as pickup trucks and station wagons to have fold-down tailgates that may be used, when the vehicle is parked, as a seat or as a table-top for placing items such as drinks, food, and the like.

For vehicles without fold-down tailgates or similar such structures, the rear bumper may be the only convenient alternative surface available for use as a seat or a table-top. However, the upper surfaces of bumpers are typically quite narrow and are often slanted at an angle that would cause a seated person to slide off or have to push back with his or her legs to remain seated. In addition, bumper surfaces are typically coated with substances such as dirt and road salt—substances which can leave unsightly marks on one's clothing.

What is needed is a stowable seat with a surface that is wide enough and level enough to seat a person without the problems present in existing rear bumper configurations.

SUMMARY OF THE INVENTION

An automotive seat assembly 10, 10' is provided that comprises a platform 18, 18' including an upper seating surface 20, 20' supported on an automotive vehicle 12, 12'. The vehicle 12, 12' includes an exterior shell 14, 14' that defines and bounds a vehicle interior. At least a portion of the upper seating surface 20, 20' extends outside the vehicle interior when the platform 18, 18' is in a generally horizontal use position. A platform support structure 24, 24' is supported on the vehicle 12, 12' and is engageable with the platform 18, 18' to support the platform 18, 18' in the use position. Characterizing the invention is an opening 22, 22' in the exterior shell 14, 14' through which the platform 18, 18' is movable between the use position and an interior stowed position within the vehicle interior to protect the platform 18, 18' from the elements and to prevent the platform 18, 18' from interfering with the operation of a vehicle bumper 26, 26' in a collision.

Unlike existing automotive seating systems and exterior vehicle structures, a seat assembly constructed according to the present invention has a platform and seating surface that may be kept clean by moving the platform to a stowed position in the vehicle interior when the seat assembly is not in use. In addition, the platform width may extend laterally beyond an associated vehicle bumper when in the use position.

BRIEF DESCRIPTION OF THE DRAWINGS

To better understand and appreciate the invention, refer to the following detailed description in connection with the accompanying drawings:

FIG. 5 is a cross-sectional side view of the seat assembly of FIG. 1 with the platform in the stowed position;

FIG. 6 is a cross-sectional side view of the seat assembly of FIG. 1 with the platform in a raised position;

DETAILED DESCRIPTION OF THE PREFERRED EMBODIMENT

Figure 1:
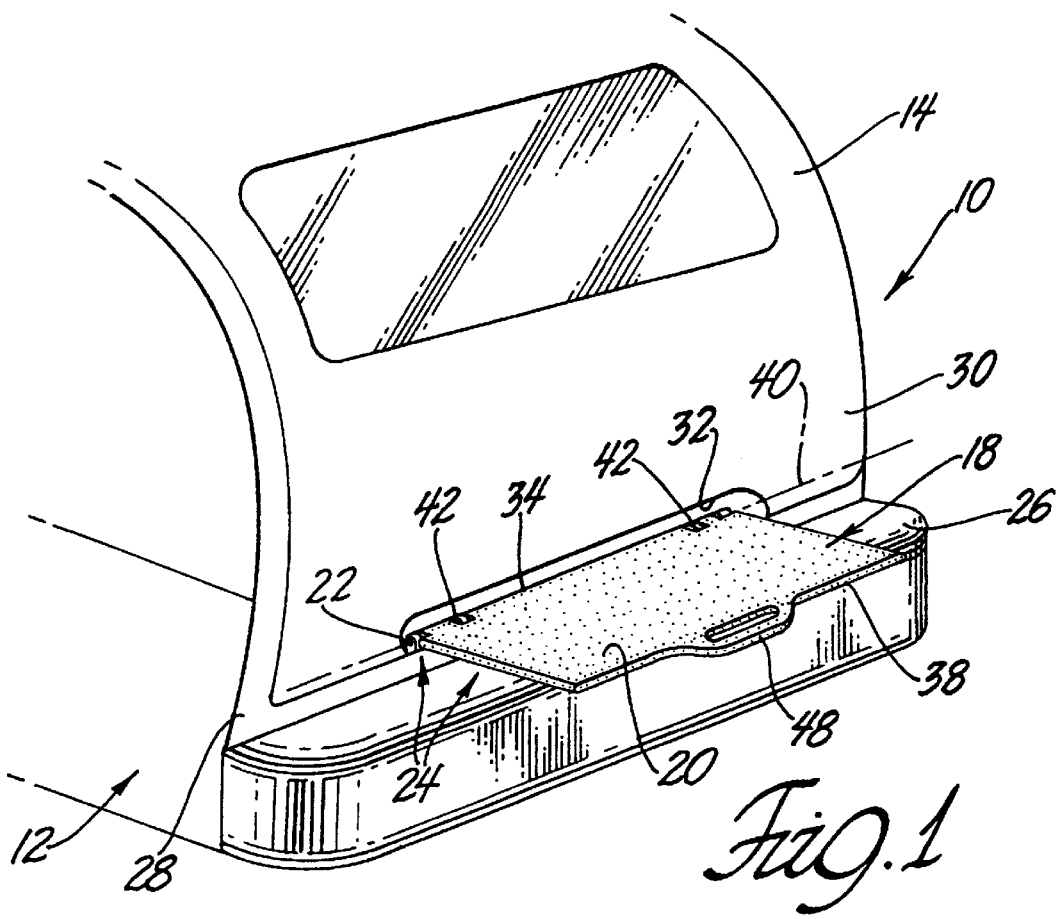
FIG. 1 is a perspective view of an exterior seat assembly constructed according to the present invention and installed in an automotive vehicle with a platform of the seat assembly in a use position.
Figure 2:
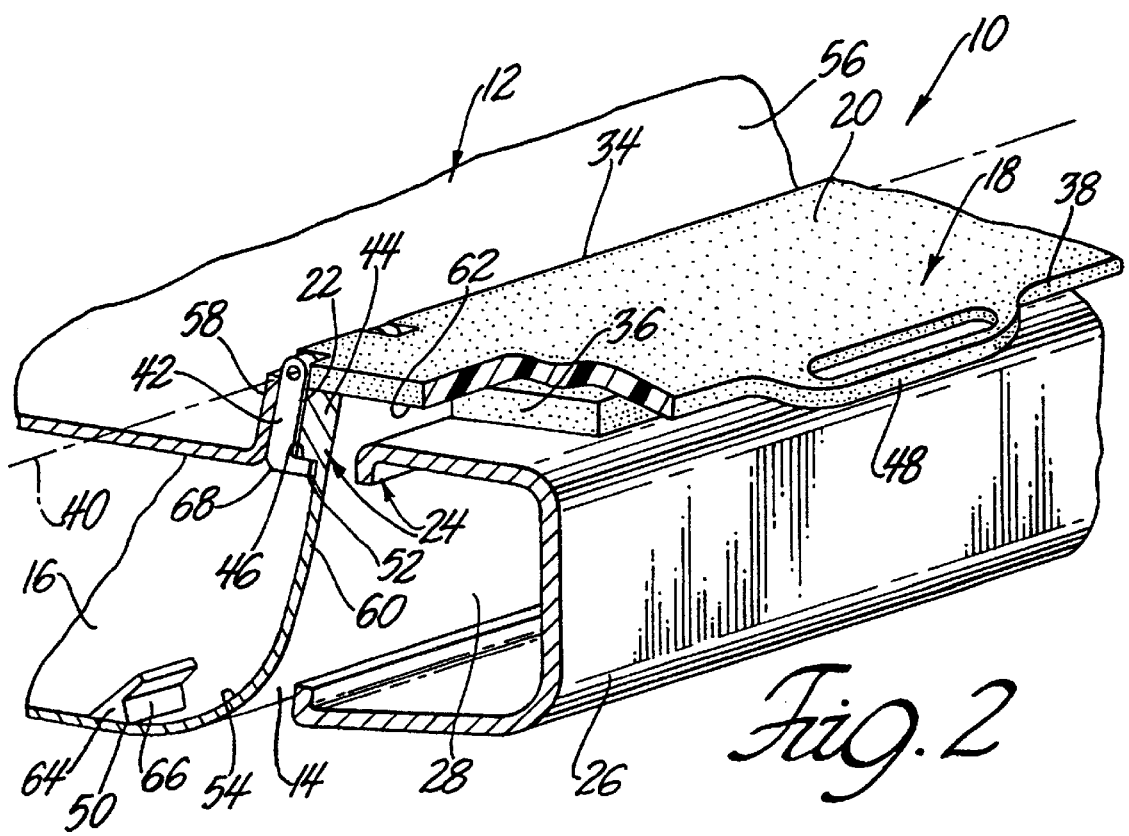
FIG. 2 is a partially cut-away cross-sectional perspective view of the seat assembly of FIG. 1.
Figure 3:
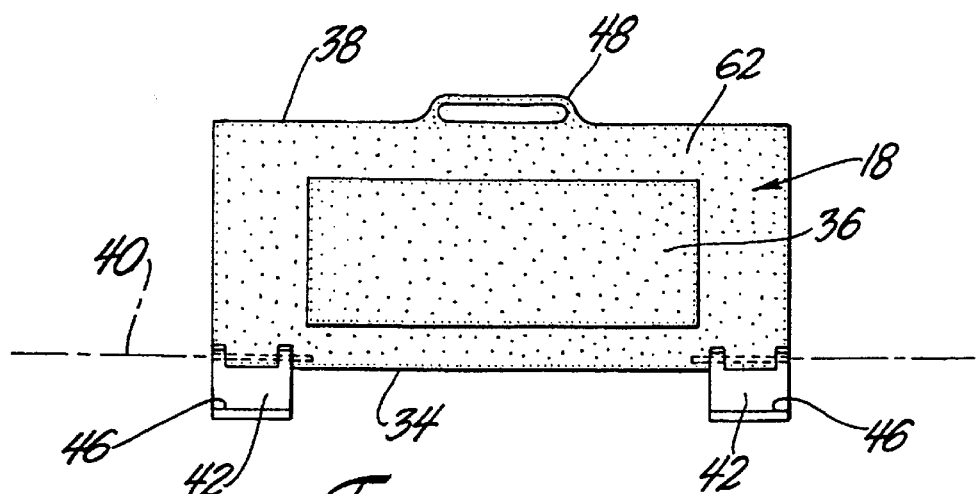
FIG. 3 is a bottom view of the platform portion of the seat assembly of FIG. 1.

An automotive seat assembly constructed according to the present invention is generally shown at 10 in FIGS. 1–7. The automotive seat assembly 10 includes an automotive vehicle 12 comprising an exterior shell 14 that defines and bounds a vehicle interior 16. Supported on the vehicle 12 is a movable platform 18 with an upper seating surface 20.

The platform 18 is movable between an interior stowed position within a storage compartment in the vehicle interior 16 and a generally horizontal exterior use position. The platform 18 is shown in the use position in FIGS. 1, 2 and 7 and in the stowed position in FIG. 5. In the use position at least a portion of the upper seating surface 20 extends outside the vehicle interior 16. While moving between these two positions, the platform 18 passes through a storage compartment opening 22 in the exterior shell 14.

A platform support structure, generally indicated at 24 in FIGS. 1, 2 and 4–7, is supported on the vehicle 12 adjacent the opening 22. As is described in greater detail below, in the present embodiment, the platform support structure 24 includes both a rear bumper 26 attached to the vehicle 12 and structures forming and defining the storage compartment opening 22. The platform support structure 24 engages the platform 18, both at the storage compartment opening 22 and at the rear bumper 26, to secure the platform 18 in the use position and to support the platform 18 when downward loads and/or side loads are applied to the seating surface 20.

For purposes of this description, the exterior shell 14 of the automotive vehicle 12 is defined to include an unbroken imaginary exterior surface coinciding with the exterior surfaces 14 of all vehicle exterior body panels, underbody panels, suspension components and frame members. This imaginary shell also extends across all openings into the vehicle interior 16 such as window frames, grilles and the like.

For purposes of this description, the vehicle interior 16 is defined as including the entire region bounded by the imaginary shell described above. This region includes but is not limited to the passenger compartment, the engine compartment, the luggage compartment, the trunk, and spaces and structures located between the passenger compartment and exterior body panels.

As best shown in FIG. 1, the rear bumper 26 projects outward from a point on a back end portion 28 of the vehicle exterior shell 14 adjacent a back gate 30 or trunk lid of the vehicle 12.

As shown in FIG. 1, a cut-out region 32 is disposed along the lower marginal edge of the back gate 30. The cut-out region 32 is shaped to fit over an inner edge 34 of the platform 18 when the platform 18 is in the use position. This allows an operator to close the back gate 30 over the platform 18 when the platform 18 is in the use position. Alternatively, the cut-out region 32 can be provided in a cross-panel that is below the lower edge of a trunk lid or a tail gate.

The platform 18 has a generally rectangular plate-like shape and is preferably made of a plastic or other durable material resistant to marring, puncturing and damage from golf spikes or the like. This construction is intended to allow a person to place his or her foot on the platform 18 without damaging the platform 18.

As shown in FIGS. 2–7, the platform 18 includes a rectangular spacer pad 36 fastened by known means to a bottom surface of the platform 18 opposite the upper seating surface 20. When the platform 18 is in the use position, the spacer pad 36 spaces the platform 18 above and supports the platform 18 on an upper surface of the bumper 26. The spacer pad 36 can be made of soft material that also serves to protect the finish on the upper surface of the bumper 26, if necessary, from damage that might be caused by direct contact with the platform 18.

In the stowed position, the platform 18 is upwardly and rearwardly inclined with an outer edge 38 of the platform 18 disposed higher than the platform inner edge 34. The platform 18 is translationally movable along an imaginary inclined plane defined by the orientation of the platform 18 in the stowed position shown in FIG. 5 through the cut-out region 32. The platform 18 is movable in this imaginary plane between the interior stowed position and an exterior raised position shown in FIG. 5. The platform 18 is pivotally movable between the raised position and the use position about a horizontal pivot axis shown at 40 in FIGS. 1–4. The pivot axis 40 is disposed adjacent and parallel to the platform inner edge 34.

As shown in FIGS. 1–7, the platform 18 includes two pieces of mounting hardware 42 that are pivotally attached at opposite ends of the inner edge 34 of the platform 18 along the horizontal pivot axis 40. Each piece of mounting hardware 42 has an L-shaped profile and an upper end pivotally attached to the platform 18. The mounting hardware 42 is configured to allow the platform 18 to slide between the stowed and raised positions and to engage and pivot about an upper portion 44 of the platform support structure 24 between the raised and use positions. In other words, the mounting hardware 42 provides a pivot slide connection between the platform support structure 24 and the platform 18. As shown in FIGS. 2–7, the platform 18 also comprises a first deployment retainer surface 46 disposed adjacent the platform inner edge 34 on an inner surface of each piece of mounting hardware 42 adjacent a lower end of each piece of hardware 42.

The platform 18 includes a handle 48 disposed adjacent the outer edge 38 of the platform 18. The handle 48 comprises an elongated slot formed into an elongated tab portion extending outward from the outer platform edge. The handle 48 allows an operator to easily grasp the outer edge 38 of the platform 18 to move the platform 18 between the stowed and use positions. The handle 48 is integrally formed with the platform 18 as a single unitary piece. In the stowed position the platform outer edge 38 may be disposed flush with the vehicle exterior shell 14. The outer edge 38 may also be painted the same color as the vehicle exterior shell 14 to help conceal the platform 18.

The platform support structure 24 includes the rear bumper 26. The rear bumper 26 has an elongated shape and is mounted horizontally on the vehicle 12 along the back end exterior shell portion 28 of the vehicle 12 below the storage compartment opening 22 by suitable frame brackets or other support structures of a conventional type (not shown). The rear bumper 26 supports the platform 18 under downward loads when the platform 18 is in the use position.

Figure 4:
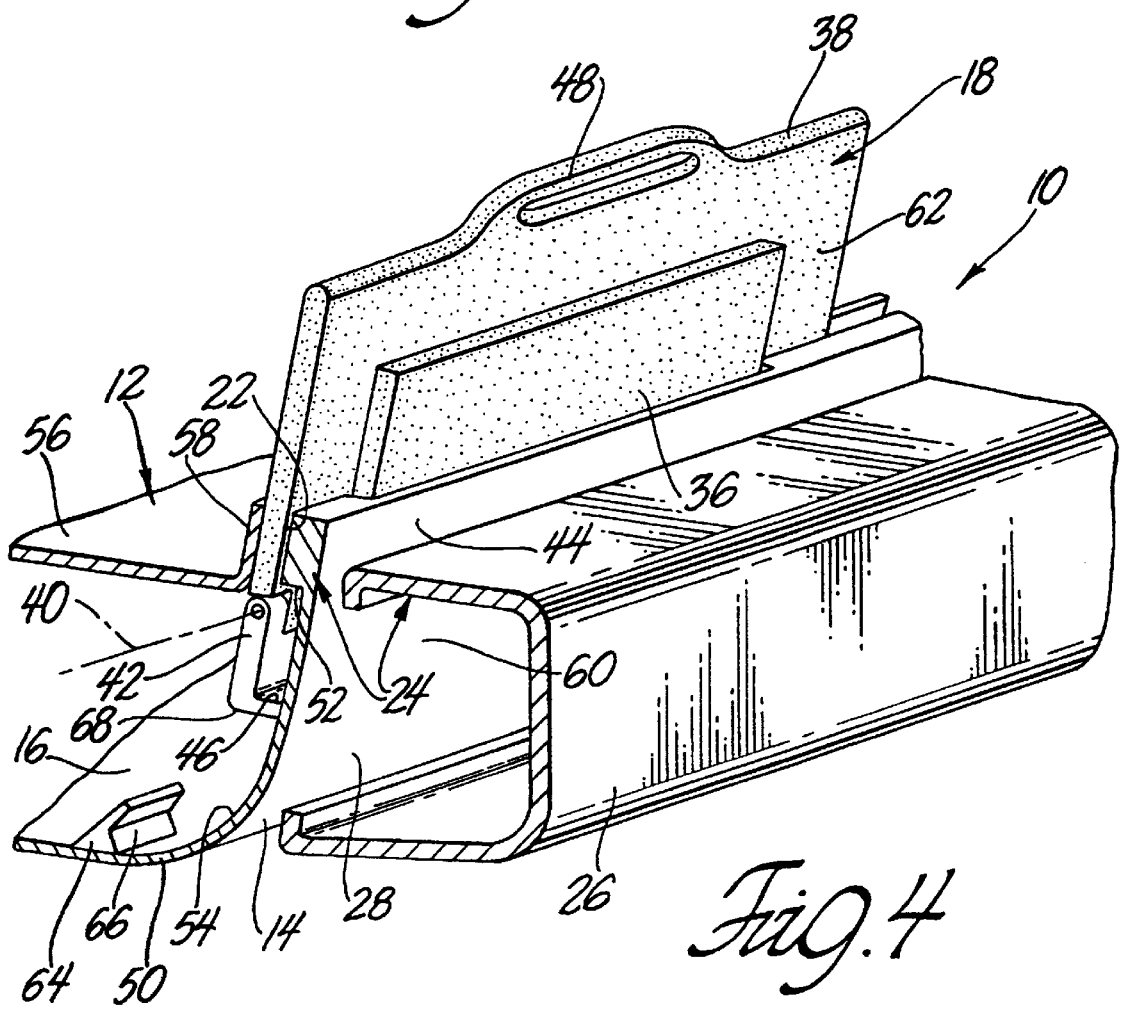
FIG. 4 is a cross-sectional perspective view of the seat assembly of FIG. 1 with the platform between a stowed and a raised position.

As previously stated, the platform support structure 24 also includes structures that form and define the storage compartment opening 22. One of those structures is a structural floor pan 50 as shown in FIGS. 2 and 4–7. As is best shown in FIG. 4, a second deployment retainer surface 52 is disposed on a lower surface of an overhang formed in an upper edge of the floor pan 50 adjacent each end of the storage compartment opening 22. The first deployment retainer surface 46 of the platform hardware 42 engages the second deployment retainer surface 52 when the platform 18 is in the raised and use positions.

A platform storage compartment, shown at 54 in FIGS. 2 and 4–7, is disposed in the vehicle interior 16 adjacent the storage compartment opening 22 in the vehicle exterior shell 14. In other words, the storage compartment 54 is accessible through the exterior shell 14 via the storage compartment opening 22, i.e., the opening 22 in the vehicle exterior shell 14. At least a portion of the platform 18 is disposed within the storage compartment 54 when the platform 18 is in the stowed position.

The storage compartment 54 comprises a portion of a space defined by and disposed between the structural floor pan 50 and a support panel 56 of the vehicle 12 shown in FIGS. 2 and 4–7. The support panel 56 has a marginal rear edge 58 spaced from an upstanding end wall 60 of the floor pan 50 defining the slot-like storage compartment opening 22 in the exterior shell 14.

The support panel 56 overlies the floor pan 50 providing, in a typical fashion, space therebetween. If the vehicle 12 is a sport utility vehicle, a station wagon or a van, then the support panel 56 will comprise the interior floor surface at the back of the vehicle 12. On the other hand, if the vehicle 12 is a sedan or other vehicle equipped with a trunk, then the support panel 56 will comprise the floor or deck of the trunk. In either case, the support panel 56 may be either permanently fixed in place or may be removably installed to allow access to the storage compartment 54.

In the present embodiment, in addition to the rear bumper 26, the platform support structure 24 also includes the upstanding rear wall 60 of the floor pan 50 and the upturned marginal rear edge 58 of the support panel 56. Together, the floor pan rear wall 60 and the upturned support panel rear edge 58 sandwich the mounting hardware 42 when the platform 18 is in either the raised position or the use position. With the mounting hardware 42 secured between these structures and with the platform 18 rotated downwardly into the use position, a bottom surface 62 of the platform 18 engages an upper marginal edge surface of the support panel 56. This holds the first deployment retainer surface 46 against the second deployment retainer surface 52 which effectively secures the platform inner edge 34 against both vertical and fore-aft lateral movement. The storage compartment 54 is sheltered from the elements by well-known means such as drain gutters and weather strips.

Two backstop members, one of which is shown at 64 in FIGS. 2 and 4–7, are connected to the floor pan 50 in the storage compartment 54. The backstop members 64 support the platform 18 by engaging the two hardware pieces 42 when the platform 18 is in the stowed position. More specifically, each backstop member 64 has a first backstop surface 66 that engages a second backstop surface 68 disposed on each of the outer surfaces of the two hardware pieces 42 of the platform 18 when the platform 18 is in the stowed position. The backstop members 64 retain the platform 18 in the stowed position, preventing the platform 18 from sliding further into the vehicle interior 16 and out of reach. Suitable side guides are provided—one of which is shown at 69 in FIGS. 6 and 7.

In other embodiments, the platform 18 may have other suitable shapes, may be constructed from different materials, and may include more than one spacer pad 36. The platform 18 may be inclined at an angle other than as shown in the present embodiment. For example, the platform 18 may be inclined in the vertical, i.e., it may have a 90 degree incline as measured from the horizontal. In addition, any of a number of different types of mounting hardware may be employed in connecting the platform 18 to the support structure 24.

Figure 7:
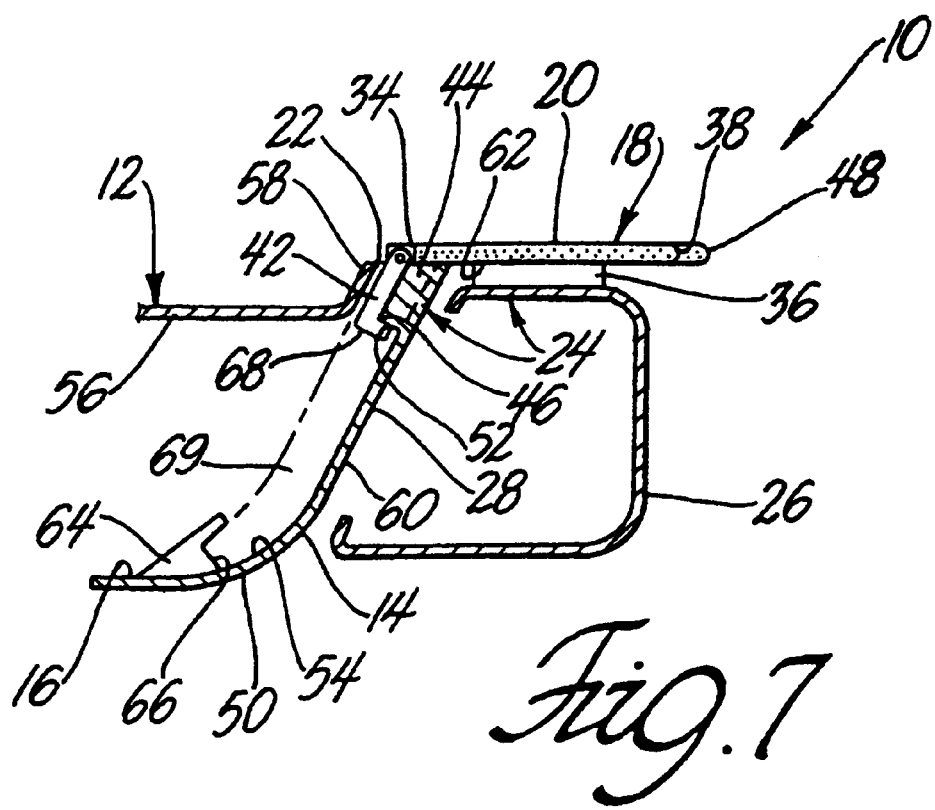
FIG. 7 is a cross-sectional side view of the seat assembly of FIG. 1 with the platform in the use position.
Figure 7A:
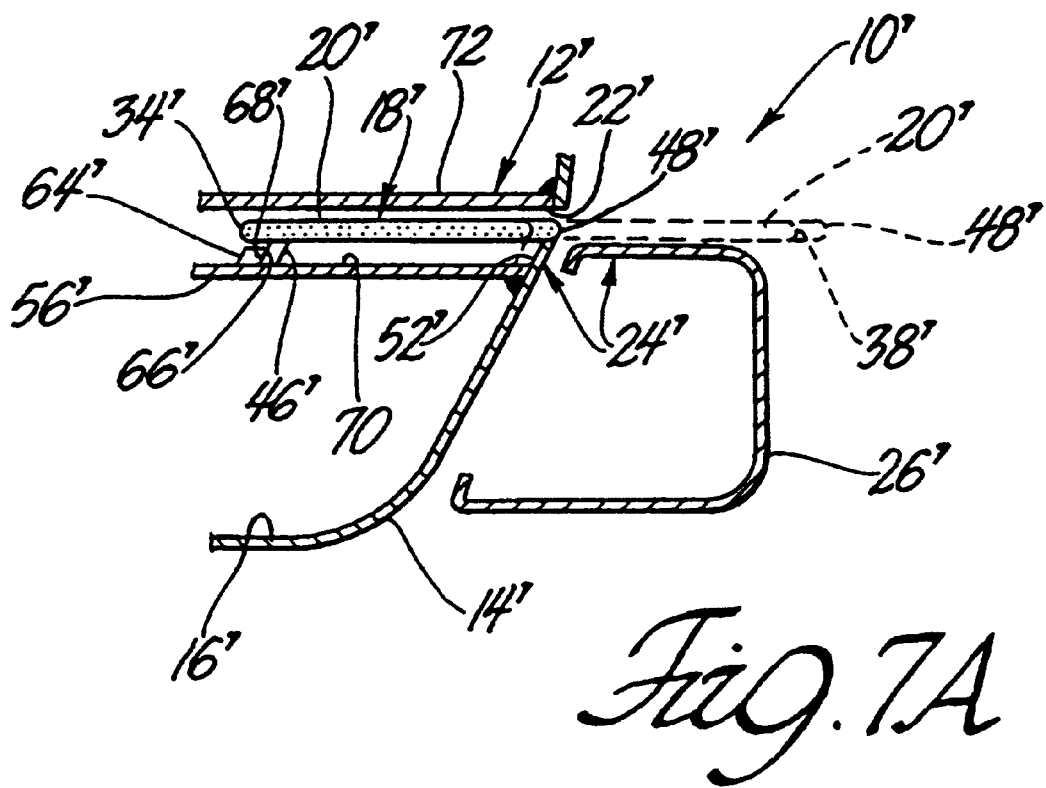
FIG. 7A is a cross-sectional side view of an alternative embodiment of the seat assembly.

In the embodiment shown in FIG. 7A, a platform 18' is pulled outwardly of a horizontally-disposed storage compartment 70 from a stowed position shown in solid line to a use position shown in broken line. In other words, the platform 18' is oriented horizontally in the stowed position and is horizontally and translationally movable between the interior stowed position and the use position. Parts in this embodiment that are similar to corresponding parts shown in the prior embodiment have the same reference numeral, only primed.

As shown in FIG. 7A, the platform 18' comprises a first deployment retainer surface 46' disposed adjacent an inner edge 34' of the platform 18'. The platform support structure 24' comprises a second deployment retainer surface 52' disposed adjacent the opening 22' in the exterior shell 14'. The first retainer surface 46' engages the second deployment retainer surface 52' when the platform (18') is in the use position.

The storage compartment 70 is disposed in the vehicle 12' adjacent the opening 22' in the vehicle exterior shell 14'. The storage compartment 70 is accessible through the exterior shell 14' via the opening 22'. At least a portion of the platform 18' is disposed within the storage compartment 70 when the platform 18' is in the stowed position.

The storage compartment 70 comprises a portion of a space between a top panel 72 and a support panel 56' of the vehicle 12'. The top panel 72 and the support panel 56' are disposed above and below the opening 22', respectively.

Two backstop members 64' are supported on the support panel 56' adjacent the platform 18' in the stowed position. Each backstop member 64' has a first backstop surface 66' engageable with a second backstop surface 68' disposed on the platform 18' when the platform 18' is in the stowed position.

Other versions of the embodiment of FIG. 7A may also include a spacer pad as shown in the embodiment of FIG. 7 at 36.

In practice, a seat assembly 10 constructed according to the present invention is employed by first grasping the platform handle 48 and withdrawing the platform 18 from its stowed position by pulling the platform 18 translationally and diagonally upward and outward. The platform 18 is pulled diagonally upward and outward until it reaches the transitory raised position where the first deployment retainer surface 46 engages the second deployment retainer surface 52 preventing the platform 18 from being withdrawn further. In this position the platform 18 is positioned above the use position. The platform outer edge 38 is then lowered, pivoting the platform 18 downward about the pivot axis 40 to the generally horizontal use position with the spacer pad 36 resting on the rear bumper 26 of the vehicle 12.

Once the platform 18 is in the use position an object may be rested on the upper seating surface 20 of the platform 18. The seating surface 20 is intended to support any of a number of different objects to include food and drink containers, a foot or the posterior of a seated person.

Following use, the platform 18 is stowed by lifting the outer edge 38 of the platform 18 upward until the platform 18 has pivoted about the pivot axis 40 into the raised position. In the raised position the platform 18 is positioned at an insertion angle that will allow it to be inserted diagonally downward into the storage compartment 54. Finally, the platform 18 is lowered translationally and diagonally from the raised position into the stowed position against the backstops 64 in the storage compartment 54.

In the embodiment of FIG. 7A, the seat assembly 10' is employed by first grasping the platform handle 48' and withdrawing the platform 18' horizontally and translationally outward from its stowed position in the storage compartment 70. The platform 18' is pulled outward to the use position where the first deployment retainer surface 46' engages the second deployment retainer surface 52' preventing the platform 18' from being withdrawn further and where the platform 18' is resting on the rear bumper 26' of the vehicle 12'. Following use, the platform 18' is stowed by pushing the platform 18' inward out of the use position and into the stowed position against the backstops 64' in the storage compartment 70.

In other embodiments, platform 18 deployment and stowage may be automatic rather than manual. Automatic deployment and stowage may be powered by any one or more of a number of different drive mechanisms known in the art such as electric servomotors, hydraulic actuators and pneumatic cylinders. Automatic deployment and stowage may be initiated by any one of a number of different electric and/or mechanical switching mechanisms known in the art.

By including the vehicle rear bumper 26 in the platform support structure 24, the platform 18 can be vertically supported without the additional structural strength that would be required to support the platform 18 in a cantilevered fashion without bumper support.

I intend the above description to illustrate embodiments of the present invention by using descriptive rather than limiting words. Obviously, there are many ways that one might modify these embodiments while remaining within the scope of the claims. In other words, there are many other ways that one may practice the present invention without exceeding the scope of the claims (where reference numerals are included merely for convenience and are not limiting).

I claim:

1. An automotive vehicle (12, 12') and seat assembly (10, 10') in which:

the vehicle (12, 12') includes an exterior shell (14) that defines and bounds a vehicle interior (16, 16');

the seat assembly (12, 12') includes a platform (18, 18') including an upper seating surface (20, 20') supported on said vehicle (12, 12'), at least a portion of said upper seating surface (20, 20') extending outside said vehicle interior (16, 16') in a generally horizontal use position;

the vehicle (12, 12') including a platform support structure (24, 24') engageable with said platform (18, 18') to support said platform (18, 18') in said use position;

an opening (22, 22') is disposed in said exterior shell (14, 14'), said platform (18, 18') being movable through said opening (22, 22') between said use position and an interior stowed position within said vehicle interior (16, 16') to protect said platform (18, 18') from the elements and to prevent said platform (18, 18') from interfering with the operation of a vehicle bumper (26, 26') in a collision;

said platform (18) defines an inclined plane when in said stowed position with an outer edge (38) of said platform (18) disposed higher than an inner edge (34) of said platform (18);

said platform (18) is translationally movable along said inclined plane between said interior stowed position and an exterior raised position above said use position; and said platform (18) is pivotally movable between said raised position and said use position about a horizontal pivot axis (40) disposed adjacent and parallel to said platform inner edge (34).

2. An automotive vehicle (12, 12') and seat assembly (10, 10'), the vehicle (12, 12') including an exterior shell (14) that defines and bounds a vehicle interior (16, 16'); the seat assembly (12, 12') comprising:

a platform (18, 18') including an upper seating surface (20, 20') supported on said vehicle (12, 12'), at least a portion of said upper seating surface (20, 20') extending outside said vehicle interior (16, 16') in a generally horizontal use position;

the vehicle including a platform support structure (24, 24') engageable with said platform (18, 18') to support said platform (18, 18') in said use position;

said vehicle (12, 12') including an opening (22, 22') in said exterior shell (14, 14'), said platform (18, 18') being movable through said opening (22, 22') between said use position and an interior stowed position within said vehicle interior (16, 16') to protect said platform (18, 18') from the elements and to prevent said platform (18, 18') from interfering with the operation of a vehicle bumper (26, 26') in a collision;

said platform support structure (24, 24') including a bumper (26, 26') supported below said opening (22, 22') in said exterior shell (14, 14'), said bumper (26, 26') supporting said platform (18, 18') when said platform (18, 18') is in said use position.

3. An automotive vehicle and seat assembly (10) as defined in claim 2 in which said platform (18) includes at least one spacer (36) disposed on a bottom surface (62) of said platform (18) opposite said upper seating surface (20).

4. An automotive vehicle and seat assembly (10) as defined in claim 2 in which said vehicle (12) includes a back gate (30) and in which said back gate (30) includes a cut-out region (32) disposed along a lower marginal edge of said back gate (30), said cut-out region (32) shaped to fit over an inner edge (34) of said platform (18) in said use position.

5. An automotive vehicle and seat assembly (10) as defined in claim 2 in which:

said platform (18) is oriented on an imaginary inclined plane in said stowed position with an outer edge (38) of said platform (18) disposed higher than an inner edge (34) of said platform (18);

said platform (18) is translationally movable along said inclined plane between said interior stowed position and an exterior raised position above said use position; and said platform (18) is pivotally movable between said raised position and said use position about a horizontal pivot axis (40) disposed adjacent and parallel to said platform inner edge (34).

6. An automotive vehicle and seat assembly (10) as defined in claim 5 in which:

said platform (18) comprises a first deployment retainer surface (46) disposed adjacent said platform inner edge (34);

said platform support structure (24) comprises a second deployment retainer surface (52) disposed adjacent said opening (22) in said exterior shell (14); and said first retainer surface (46) engages said second deployment retainer surface (52) when said platform (18) is in said use position.

7. An automotive vehicle and seat assembly (10) as defined in claim 6 in which said platform (18) includes mounting hardware pivotally attached to said inner edge (34) of said platform (18) along said horizontal pivot axis (40).

8. An automotive vehicle and seat assembly (10) as defined in claim 7 further including a storage compartment (54) disposed in said vehicle (12) adjacent said opening (22) in said vehicle exterior shell (14), said storage compartment (54) being accessible through said exterior shell (14) via said opening (22), at least a portion of said platform (18) being disposed within said storage compartment (54) in said stowed position.

9. An automotive vehicle and seat assembly (10) as defined in claim 8 in which said storage compartment (54) comprises a portion of a space between a floor pan (50) and a support panel (56) of said vehicle (12), said support panel (56) having a marginal rear edge (58) spaced from an upstanding end wall (60) of said floor pan (50) defining said opening (22) in said exterior shell (14).

10. An automotive vehicle and seat assembly (10) as defined in claim 9 further including at least one backstop member (64) supported on said floor pan (50) adjacent said platform (18) in said stowed position, said backstop member (64) having a first backstop surface (66) engageable with a second backstop surface (68) disposed on said platform (18) when said platform (18) is in said stowed position.

11. An automotive vehicle and seat assembly (10) as defined in claim 10 in which said first deployment retainer surface (46) and said second backstop surface (68) are disposed on said mounting hardware.

12. An automotive vehicle and seat assembly (10') as defined in claim 2 in which:

said platform (18') is oriented horizontally in said stowed position;

said platform (18') is horizontally and translationally movable between said interior stowed position and said use position.

13. An automotive vehicle and seat assembly (10') as defined in claim 12 in which:

said platform (18') comprises a first deployment retainer surface (46') disposed adjacent an inner edge (34') of said platform (18');

said platform support structure (24') comprises a second deployment retainer surface (52') disposed adjacent said opening (22') in said exterior shell (14'); and said first retainer surface (46') engages said second deployment retainer surface (52') when said platform (18') is in said use position.

14. An automotive vehicle and seat assembly (10') as defined in claim 13 further including a storage compartment (70) disposed in said vehicle (12') adjacent said opening (22') in said vehicle exterior shell (14'), said storage compartment (70) being accessible through said exterior shell (14') via said opening (22'), at least a portion of said platform (18') being disposed within said storage compartment (70) in said stowed position.

15. An automotive vehicle and seat assembly (10') as defined in claim 14 in which said storage compartment (70) comprises a portion of a space between a top panel (72) and a support panel (56') of said vehicle (12'), said top panel (72) and said support panel (56') disposed above and below said opening (22'), respectively.

16. An automotive vehicle and seat assembly (10, 10') as defined in claim 1 further including a handle (48, 48') disposed adjacent an outer edge (38, 38') of said platform (18, 18').

17. An automotive vehicle and seat assembly (10, 10') as defined in claim 16 in which said handle is integrally formed with said platform (18, 18') as a single unitary piece.

18. An automotive seat assembly (10, 10') comprising:
a platform (18, 18') having an upper seating surface (20, 20');
a platform support structure (24, 24') engageable with said platform (18, 18') and configured to be supported on an automotive vehicle (12, 12') and to secure said platform (18, 18') in a generally horizontal exterior use position on the vehicle;
said support structure (24, 24'), further configured to support said platform (18, 18') for movement between said exterior use position and an interior stowed position generally within said platform storage compartment (54, 70);
said platform (18) defines an inclined plane when in said stowed position with an outer edge (38) of said platform (18) disposed higher than an inner edge (34) of said platform (18);
said platform (18) is translationally movable along said inclined plane between said interior stowed position and an exterior raised position above said use position; and
said platform (18) is pivotally movable between said raised position and said use position about a horizontal pivot axis (40) disposed adjacent and parallel to said platform inner edge (34).

19. An automotive seat assembly (10, 10') comprising:
a platform (18, 18') having an upper seating surface (20, 20');
a platform support structure (24, 24') engageable with said platform (18, 18') and configured to be supported on an automotive vehicle (12, 12') and to secure said platform (18, 18') in a generally horizontal exterior use position on the vehicle, said support structure (24, 24'), further configured to support said platform (18, 18') for movement between said exterior use position and an interior stowed position generally within said platform storage compartment (54, 70), said platform support structure (24, 24') including a bumper (26, 26') configured to be supported on a vehicle (12, 12') adjacent said storage compartment (54, 70), at least a portion of said platform (18, 18') extending from said opening (22, 22') and resting on said bumper (26, 26') when said platform (18, 18') is in said use position.

20. A method for using an automotive seat assembly (10, 10') supported on an automotive vehicle (12, 12'), the vehicle having a storage compartment (54, 70), the seat assembly including a platform (18, 18') movable between an interior stowed position within said storage compartment and a generally horizontal exterior use position, said method including the steps of:
moving the platform from the stowed position;
moving the platform to the use position; and
said step of moving the platform (18, 18') to the use position includes the step of resting the platform (18, 18') on an automotive bumper (26, 26') supported adjacent the storage compartment (54, 70).

21. A method for using an automotive seat assembly (10, 10') supported on an automotive vehicle (12, 12'), the vehicle having a storage compartment (54, 70), the seat assembly including a platform (18, 18') movable between an interior stowed position within said storage compartment and a generally horizontal exterior use position, said method including the steps of:
moving the platform from the stowed position;
moving the platform to the use position;
said step of withdrawing the platform (18) from the stowed position includes the step of pulling the platform (18) translationally upward and outward to a transitory raised position above the use position; and
said step of moving the platform (18) to the use position includes the step of lowering an outer edge (38) of the platform (18) to pivot the platform (18) downward about a pivot axis (40) disposed adjacent and parallel to an inner edge (34) of the platform (18) to the generally horizontal use position.

22. The method of claim 21 further including the step of stowing the platform (18) by:
lifting the outer edge (38) of the platform (18) upward until the platform (18) has pivoted about the pivot axis (40) into the raised position; and
translationally lowering the platform (18) into the stowed position.

* * * * *